United States Patent
Wang et al.

(10) Patent No.: US 9,440,218 B2
(45) Date of Patent: Sep. 13, 2016

(54) METHODS AND ACTIVE MATERIALS FOR REDUCING HALIDE CONCENTRATION IN GAS STREAMS

(71) Applicant: Clariant Corporation, Louisville, KY (US)

(72) Inventors: Justin X. Wang, Louisville, KY (US); Simran K. Sokhey, Louisville, KY (US); Jason E. Spencer, Palmyra, IN (US); Yeping Cai, Louisville, KY (US)

(73) Assignee: Clariant Corporation, Louisville, KY (US)

( * ) Notice: Subject to any disclaimer, the term of this patent is extended or adjusted under 35 U.S.C. 154(b) by 550 days.

(21) Appl. No.: 13/917,029

(22) Filed: Jun. 13, 2013

(65) Prior Publication Data

US 2014/0370289 A1    Dec. 18, 2014

(51) Int. Cl.

| | |
|---|---|
| *B22F 1/00* | (2006.01) |
| *B01J 20/08* | (2006.01) |
| *B01D 53/04* | (2006.01) |
| *B01J 20/04* | (2006.01) |
| *B01J 20/06* | (2006.01) |
| *B01D 53/68* | (2006.01) |
| *B01J 20/02* | (2006.01) |
| *B01J 20/28* | (2006.01) |
| *B01J 20/30* | (2006.01) |
| *B01J 20/12* | (2006.01) |
| *B01J 20/20* | (2006.01) |
| *B01J 20/32* | (2006.01) |
| *B01J 20/18* | (2006.01) |
| *B01J 20/10* | (2006.01) |

(52) U.S. Cl.
CPC ............ *B01J 20/08* (2013.01); *B01D 53/04* (2013.01); *B01D 53/685* (2013.01); *B01J 20/02* (2013.01); *B01J 20/041* (2013.01); *B01J 20/06* (2013.01); *B01J 20/103* (2013.01); *B01J 20/12* (2013.01); *B01J 20/18* (2013.01); *B01J 20/20* (2013.01); *B01J 20/28016* (2013.01); *B01J 20/28019* (2013.01); *B01J 20/28057* (2013.01); *B01J 20/28069* (2013.01); *B01J 20/3007* (2013.01); *B01J 20/3204* (2013.01); *B01J 20/3236* (2013.01); *B22F 1/0003* (2013.01); *B01D 2251/30* (2013.01); *B01D 2251/306* (2013.01); *B01D 2251/40* (2013.01); *B01D 2251/408* (2013.01); *B01D 2251/60* (2013.01); *B01D 2251/602* (2013.01); *B01D 2253/112* (2013.01); *B01D 2253/1122* (2013.01); *B01D 2253/1124* (2013.01); *B01D 2257/204* (2013.01); *B01D 2257/206* (2013.01); *B01D 2257/2045* (2013.01); *B22F 1/0059* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 3,983,216 A | 9/1976 | Sudduth et al. | |
| 4,022,869 A | 5/1977 | Saitoh et al. | |
| 5,401,872 A | 3/1995 | Burgie et al. | |
| 5,578,283 A * | 11/1996 | Chen | B01D 53/864 423/240 R |
| 5,653,949 A | 8/1997 | Chen | |
| 5,670,445 A | 9/1997 | Kitahara | |
| 5,817,284 A | 10/1998 | Nakano | |
| 6,106,790 A | 8/2000 | Hsiung | |
| 6,338,312 B2 | 1/2002 | Hayes | |
| 6,685,901 B2 | 2/2004 | Hirano | |
| 6,875,725 B2 * | 4/2005 | Lindner | B01D 53/945 423/213.5 |
| 7,691,351 B2 | 4/2010 | Revankar et al. | |
| 7,767,000 B1 | 8/2010 | Siriwardane | |
| 8,007,688 B2 | 8/2011 | Dahlin et al. | |
| 8,771,501 B2 | 7/2014 | Cosyns | |
| 2004/0224840 A1 * | 11/2004 | Kim | B01D 53/865 502/309 |
| 2007/0006730 A1 | 1/2007 | Hsu | |
| 2008/0283446 A1 * | 11/2008 | Tatarchuk | B01D 53/02 208/246 |
| 2009/0286998 A1 * | 11/2009 | Evans | B01D 53/02 549/230 |

* cited by examiner

*Primary Examiner* — George Wyszomierski
*Assistant Examiner* — Ngoclan T Mai

(57) ABSTRACT

The present disclosure relates generally to methods and active materials for purifying gas streams containing halide as a contaminant, for example, in amounts as low as parts-per-million (ppm) or even parts-per-billion (ppb). In one aspect of the invention, an active material includes (a) one or more first metals each present as a metal oxide or metal hydroxide, the first metals being selected from the group consisting of iron, cobalt, nickel, copper, ruthenium, rhodium, palladium, silver, osmium, iridium, platinum, and gold; and (b) one or more second metals each present as a metal oxide or metal hydroxide, the one or more second metals being selected from the group consisting of alkali metals, alkaline earth metals, scandium, yttrium, titanium, zirconium, hafnium, vanadium, niobium, tantalum, chromium, molybdenum, tungsten, manganese, technetium, and rhenium.

26 Claims, No Drawings

ND ACTIVE MATERIALS FOR
METHODS AND ACTIVE MATERIALS FOR REDUCING HALIDE CONCENTRATION IN GAS STREAMS

BACKGROUND OF THE INVENTION

1. Field of the Invention

The present disclosure relates generally to methods and active materials for purifying gas streams containing halide as a contaminant, for example, in amounts as low as parts-per-million (ppm) or even parts-per-billion (ppb).

2. Technical Background

Halogen products and byproducts present a serious problem in the chemical industry by causing, among other things, deactivation of downstream catalysts and corrosion of equipment. For example, in ammonia and hydrogen manufacturing, halide such as hydrogen chloride can significantly reduce process efficiency by poisoning a variety of catalysts such as reformer catalysts, high-temperature shift catalysts, Fischer-Tropsch catalysts and, in particular, copper-based low-temperature shift catalysts. In fact, less than 1 ppm halide can severely deactivate downstream catalysts in ammonia and hydrogen plants, especially copper-based catalysts. Thus, it is desirable to remove any halide present in the gas stream before it comes in contact with the catalysts.

The removal of relatively large amounts of halide from gas streams using metal sorbents such as Ca-based materials, Mg-based materials, Mn-based materials, Zn-based materials and alkaline-based materials has been previously disclosed. While these sorbents can strip large amounts of halide, they are less effective in removing very low amounts of halogen from a gas stream; i.e. the lower the halogen content in the gas stream, the more difficult it is to remove it.

There remains a need for methods and active materials that can remove halide even when it is present at low levels in a gas stream,

SUMMARY OF THE INVENTION

In certain aspects, the present invention addresses the need for a sensitive purification method of a gas stream containing relatively low amounts of halide. In broad aspect, the disclosure provides for a purification of the gas stream containing halide in amounts as low as parts-per-million (ppm) or even as low as parts-per-billion (ppb).

Thus, in one aspect, the disclosure provides a method for reducing halide concentration in a gas stream, the method comprising contacting the gas stream with an active material under a set of process conditions, the active material comprising:
 (a) one or more first metals each present in a metallic state at the process conditions, the one or more first metals being selected from the group consisting of iron, cobalt, nickel, copper, ruthenium, rhodium, palladium, silver, osmium, iridium, platinum, and gold; and
 (b) one or more second metals each present in a metal oxide and/or metal hydroxide state at the process conditions, the one or more second metals being selected from the group consisting of alkali metals, alkaline earth metals, scandium, yttrium, titanium, zirconium, hafnium, vanadium, niobium, tantalum, chromium, molybdenum, tungsten, manganese, technetium, and rhenium.

In another aspect, the disclosure provides an active material useful in the methods of the disclosure. Such active material comprises:
 (a) one or more first metals, the one or more first metals being selected from the group consisting of iron, cobalt, nickel, copper, ruthenium, rhodium, palladium, silver, osmium, iridium, platinum, and gold; and
 (b) one or more second metals, the one or more second metals being selected from the group consisting of alkali metals, alkaline earth metals, scandium, yttrium, titanium, zirconium, hafnium, vanadium, niobium, tantalum, chromium, molybdenum, tungsten, manganese, technetium, and rhenium.

In certain embodiments (for example, at a desired set of process conditions), the one or more first metals are each present in a metallic state; and the one or more second metals are each present in a metal oxide and/or metal hydroxide state.

Specific embodiments of the present invention will become evident from the following detailed description of certain embodiments, examples, and the claims.

DETAILED DESCRIPTION OF THE INVENTION

Before the disclosed methods and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein the term "contacting" includes the physical contact of at least one substance to another substance.

As used herein the term "halide" includes substance containing fluoride, chloride, bromide, or iodide. The halide of interest can be, e.g., hydrogen halide, ammonium halide or an organic halide, or a combination thereof. In certain embodiments, the halide of interest is hydrogen halide, e.g., hydrogen chloride. In other embodiments, the halide of interest is an organic halide, such as an alkyl halide (e.g., alkyl chloride).

As used herein the term "sufficient amount" and "sufficient time" includes an amount and time needed to achieve the desired result or results, e.g., dissolve a portion of the polymer.

All percentages, ratios and proportions herein are by weight, unless otherwise specified. A weight percent (weight %, also as wt %) of a component, unless specifically stated to the contrary, is based on the total weight of the formulation or composition in which the component is included (e.g., on the total amount of the active material).

All temperatures are in degrees Celsius (° C.) unless otherwise specified.

In view of the present disclosure, the methods and active materials described herein can be configured by the person of ordinary skill in the art to meet the desired need. In general, the disclosed methods, materials and apparati provide several unmet advantages to the purification of gas streams. The methods described herein can be used to significantly reduce the concentration of halide in the gas stream, and in some embodiments can be used to substantially remove all halide from the gas stream. For example, in certain aspects the method reduces the concentration of halide present in amounts as low as parts-per-million (ppm) or even as low as parts-per-billion (ppb). In addition, the methods, materials and apparati can be adapted for use with gas streams regardless of whether they contain steam.

One embodiment of the invention is an active material including:
(a) one or more first metals being selected from the group consisting of iron, cobalt, nickel, copper, ruthenium, rhodium, palladium, silver, osmium, iridium, platinum, and gold; and
(b) one or more second metals selected from the group consisting of alkali metals, alkaline earth metals, scandium, yttrium, titanium, zirconium, hafnium, vanadium, niobium, chromium, molybdenum, tungsten, manganese, technetium, and rhenium.

The one or more first metals and the one or more second metals can be in any oxidation state at atmospheric conditions; as described below, they can be selected to be in certain particular oxidation states at a set of desired process conditions.

Another embodiment of the invention is a method for reducing the concentration of halide from a gas stream that includes contacting the gas stream with an active material as described herein under a set of process conditions, under which process conditions the one or more first metals are each present in a metallic state, and the one or more second metals are each present in a metal oxide and/or metal hydroxide state.

As described above, the one or more first metals are each present in a metallic state under the process conditions. That is, under the process conditions (e.g., temperature, pressure, oxygen content, water content, hydrogen content, hydrocarbon content, carbon monoxide content, carbon dioxide content, and the like) the one or more first metals are substantially in a fully reduced oxidation state. For example, in certain embodiments, at least about 80%, at least about 90%, at least about 95%, or even at least about 99% of the atoms of the one or more first metals are in a fully reduced oxidation state. The one or more first metals can be present, for example, as one or more discrete substantially metallic phases in the active material.

As described above, the one or more second metals are each present in a metal oxide and/or hydroxide state under the process conditions. That is, under the process conditions (e.g., temperature, pressure, oxygen content, water content, hydrogen content, hydrocarbon content, carbon monoxide content, carbon dioxide content, and the like) the one or more second metals are substantially in an oxidized oxidation state, bound to oxygen atoms in the form of an oxide or hydroxide material. For example, in certain embodiments, at least about 80%, at least about 90%, at least about 95%, or even at least about 99% of the atoms of the one or more second metals are in an oxidized oxidation state. The one or more second metals can be present, for example, as one or more discrete substantially oxide and/or hydroxide phases in the active material.

Notably, the active materials disclosed herein include a metallic species in a metallic state and a metallic species in an oxide and/or hydroxide state. Without being bound to a particular theory, it is believed that gas phase halide adsorbs and breaks down to halogen atoms (e.g., chlorine atoms) on the metallic surface. The halogen atoms migrate to the metal oxide and/or hydroxide surface to be trapped as metal halides.

The disclosed methods and active materials may be utilized for purifying gas streams having a wide variety of halides. As noted above, in one particular embodiment, the halide in the gas stream is hydrogen chloride. These methods and active materials may also be utilized for purifying gas streams having a wide variety of halide levels. For example, in certain embodiments of the methods described herein, the gas stream contains from about 0.001 to about 1000 ppm halide. In certain embodiments, the gas stream contains about 0.01 to about 0.1 ppm, or about 0.01 to about 100 ppm, or about 0.001 ppm to about 10 ppm, or about 0.01 to about 10 ppm, or about 0.1 to about 0.5 ppm, or about 0.1 to about 1 ppm, or about 0.1 to about 10 ppm, or about 1 to about 100 ppm of halide. In other embodiments, the gas stream contains about 0.3 to about 0.4 ppm of halide.

In addition to halide (such as hydrogen chloride), the disclosed methods and active materials can also be effective in removing other contaminants from a gas stream. For example, in certain embodiments, the disclosed methods and active materials can additionally remove one or more sulfur-containing compounds (e.g., COS, $H_2S$) from the gas stream. The disclosed methods and active materials can also remove the sulfur-containing compounds from the gas stream that does not contain a halide. In other embodiments, the disclosed methods and active materials can additionally remove metal dust from the gas stream. In yet other embodiments, the gas stream may not contain a halide.

One embodiment of the disclosure provides for a method or an active material as described herein, where the one or more first metals are selected from the group consisting of iron, cobalt, nickel, copper, palladium, and silver. For example, in certain embodiments, the one or more first metals are copper, silver, or gold. In another embodiment, the one or more first metals are copper or silver.

In certain embodiments of the methods and active materials described herein, the one or more second metals are selected from the group consisting of alkali metals (e.g., Li, Na, K or Rb; or Li, Na or K), alkaline earth metals (e.g., Be, Mg, Ca, Sr or Ba; or Mg, Ca, Sr or Ba), vanadium, niobium, tantalum, chromium, molybdenum, tungsten, manganese, technetium, and rhenium. For example, in one embodiment, the one or more second metals are selected from of alkali metals (e.g., Li, Na, K or Rb; or Li, Na or K) and alkaline earth metals (e.g., Be, Mg, Ca, Sr or Ba; or Mg, Ca, Sr or Ba). In certain particular embodiments, the one or more second metals are rubidium, cesium, strontium, or barium. In other particular embodiments, the one or more second metals are cesium or barium. In still other particular embodiments, the one or more second metals are vanadium, niobium, chromium, molybdenum, manganese, or technetium. In certain embodiments, the one or more second metals are vanadium, chromium, or manganese.

The ratio of the metal present in the metallic state to the metal present in the metal oxide and/or metal hydroxide state can be important for the performance of the active material. Thus, in certain embodiments of the active materials and methods as described herein, the ratio (i.e., by weight, calculated as oxides) of the one or more first metals to the one or more second metals is in the range of about 1:7 to about 7:1. In various embodiments, the ratio of the one or more first metals to the one or more second metals is in the range of about 1:5 to about 5:1, or about 1:4 to about 4:1, or about 1:3 to about 3:1, or about 1:2 to about 2:1, or about 1:1, or about 1:2, or about 1:3, or about 1:4, or about 1:5, or about 1:6, or about 1:7, or about 2:1, or about 3:1, or about 4:1, or about 5:1, or about 6:1, or about 7:1. In one particular embodiment, the ratio of the one or more first metals to the one or more second metals is in the range of about 1:4 to about 4:1. In certain embodiments, the ratio of the one or more first metals to the one or more second metals is in the range of about 1:2 to about 2:1.

Moreover, the amount of the one or more first metals and one or more second metals can be important for the performance of the active material. Thus, in certain embodiments of the active materials and methods as described herein, the total weight of the one or more first metals and the one or more second metals (calculated as oxides) is about 5 to about 100 weight % of the active material. For example, in various embodiments, the total weight of the one or more first metals and the one or more second metals (calculated as oxides) is about 5 to about 95 weight %, or about 5 to about 90 weight %, or about 10 to about 100 weight %, or about 10 to about 95 weight %, or about 10 to about 90 weight %, or about 15 to about 100 weight %, or about 15 to about 95 weight %, or about 15 to about 90 weight %, or about 20 to about 100 weight %, or about 20 to about 95 weight %, or about 20 to about 90 weight %, or about 30 to about 100 weight %, or about 30 to about 95 weight %, or about 30 to about 90 weight %, or about 30 to about 80 weight %, or about 30 to about 70 weight %, or about 30 to about 60 weight %, or about 30 to about 50 weight %, or about 50 to about 70 weight %, or about 50 to about 80 weight %, or about 50 to about 90 weight %, or about 30 to about 100 weight %, or about 50 to about 100 weight %, or about 60 to about 100 weight % of the active material. In one particular embodiment, the total weight of the one or more first metals and the one or more second metals (calculated as oxides) is about 30 to about 90 weight % of the active material. As the person of ordinary skill in the art will appreciate, the active materials may include other ingredients, such as those conventional in the art.

The active material may further comprise one of more carriers or binders, as would be apparent to the person of ordinary skill in the art. For example, in certain embodiments of the methods and active materials described herein, the active material further comprises a carrier or binder selected from the group consisting of zinc oxide, aluminum oxide, silicon dioxide, titanium oxide, a clay, a zeolite, carbon, a cement, or a combination thereof. In other embodiments, the carrier or binder can be selected from the group consisting of zinc oxide, aluminum oxide, silicon dioxide, titanium oxide, magnesium oxide (e.g., when magnesium is not a second metal), manganese oxide (e.g., when manganese is not a second metal), zirconium oxide (e.g., when zirconium is not a second metal), a clay, a zeolite, carbon, a cement, or a combination thereof. For example, in one embodiment, the carrier or binder is aluminum oxide. In another embodiment, the carrier or binder is silicon dioxide. In another embodiment, the carrier or binder is zinc oxide.

The carriers or binders can be provided in a total amount, for example, in the range of from about 0.5 to about 95 weight % of the total weight of the active material. In various embodiments of the methods and active materials described herein, the one or more carriers or binders are provided in a total amount, for example, in the range of about 0.5 to about 80 weight %, or about 0.5 to about 30 weight %, or about 10 to about 95 weight %, or about 5 to about 70 weight %, or about 10 to about 70 weight %, or about 5 to about 60 weight %, or about 10 to about 60 weight %, or about 5 to about 50 weight %, or about 10 to about 50 weight %, or about 1 to about 50 weight %, or about 15 to about 50 weight %, or about 25 to about 50 weight % of the total weight of the active material. Of course, in other embodiments the active material can be used in unsupported form, for example, when combination of the one or more first metals and the one or more second metals provides the desired physical properties to the active material. For example, one or more of the first metals and/or second metals can themselves act as a carrier or binder for the other components.

The active material may be provided in any suitable form. For example, the active material can be formed as spheres, pellets, cylinders (hollow or otherwise), symmetrical or asymmetrical tri-quadrulobes, or other shape/medium, for example, using extrusion methods. The active material may have any suitable pore volume such as about 0.1 to about 1.5 cm$^3$/g, or about 0.5 to about 1.5 cm$^3$/g, about 1 to about 1.5 cm$^3$/g, or about 0.1 to about 1 cm$^3$/g, or about 0.1 to about 0.5 cm$^3$/g, or about 0.1 cm$^3$/g, or about 0.5 cm$^3$/g, or about 1 cm$^3$/g, or about 1.5 cm$^3$/g. In particular embodiments, the active material has a pore volume of about 0.2 to about 1.2 cm$^3$/g. In other particular embodiments, the active material has a pore volume of about 0.3 to about 0.9 cm$^3$/g.

The surface area of the active material may be from about 10 to about 400 m$^2$/g. Other suitable surface areas may be from about 10 to about 400 m$^2$/g, or about 50 to about 400 m$^2$/g, or about 100 to about 400 m$^2$/g, or about 200 to about 400 m$^2$/g, or about 300 to about 400 m$^2$/g, or about 10 to about 300 m$^2$/g, or about 50 to about 300 m$^2$/g, or about 100 to about 300 m$^2$/g, or about 200 to about 300 m$^2$/g, or about 10 to about 200 m$^2$/g, or about 50 to about 200 m$^2$/g, or about 100 to about 200 m$^2$/g. In one embodiment, the active material has a surface area of about 20 to about 300 m$^2$/g. In another embodiment, the active material has a surface area of about 30 to about 200 m$^2$/g.

The active material may be prepared by conventional procedures, as would be understood by the person of ordinary skill in the art. For example, in one embodiment, the active material is made by precipitation. Thus, in one embodiment, the active material is made by precipitation of one or more water soluble raw materials with a precipitation agent. Each raw material may be a water soluble metal material such as, but not limited to, a metal nitrate, a metal sulfate, a metal halide, or a metal acetate; certain raw materials may be provided with the metal species in the anion (e.g. molybdate, manganate, chromate, tungstate, vanadate). In certain embodiments, the raw material is copper nitrate, manganese nitrate, or copper ammine. The precipitation agent may be, for example, ammonium hydroxide, ammonium carbonate, a metal hydroxide, or a metal carbonate. In certain embodiments, the precipitation agent is $Na_2CO_3$. The person of ordinary skill in the art can select other suitable precipitation agents. The person of ordinary skill in the art will also appreciate that such materials can be formed with or without a binder, depending on the particular metals used and the desired active material properties.

In another embodiment, the active material is made by wetting a carrier material (or a material comprising one or more of the first and/or second metals) with one or more raw materials. Each raw material may be a water soluble metal material such as, but not limited to, a metal nitrate, a metal sulfate, a metal halide, metal amine, or a metal acetate; certain raw materials may be provided with the metal species in the anion (e.g. molybdate, manganate, chromate, tungstate, vanadate). In certain embodiments, the raw material is copper nitrate, manganese nitrate, silver nitrate, or ammonium molybdate.

The precipitated or impregnated material can be dried to provide the active material. In certain embodiments, the precipitated or impregnated material is also calcined. Calcining can be performed at any appropriate stage, e.g., before or after formation of the active material into a desired shape.

Certain particular methods for making active materials are described below in the Examples; the person of ordinary skill in the art can adapt these methods for making the active materials described generally herein, and can use other methods known in the art to make active materials described generally herein.

The methods and active materials described herein can be used to reduce halide concentration in gas streams in a wide variety of processes. For example, in certain embodiments, the methods and active materials can be used in advance of processes such as reforming, high temperature shift, Fischer-Tropsch catalysis, and, in particular, of the copper-based low temperature shift to protect poisoning of downstream catalysts.

The methods and active materials described herein can be used under a wide variety of process conditions (e.g., temperature, pressure, oxygen content, water content). For example, in certain embodiments of the methods described herein, the process conditions include a process pressure in the range of about 100 kPa to about 10 MPa. In one particular embodiment, the process conditions include a pressure of about 120 kPa to about 5 MPa. In another particular embodiment, the process conditions include a pressure of about 120 kPa.

In certain embodiments of the methods described herein, the process conditions include a process temperature in the range of about 100 to about 500° C. Other suitable temperatures include, but are not limited to a range of about 100 to about 300° C., or about 150 to about 250° C., or about 150 to about 200° C., or about 200 to about 300° C., or about 200 to about 250° C., or about 100, or about 150° C., or about 200, or about 250° C., or about 300° C.

EXAMPLES

The following examples are presented to illustrate the embodiments of the present invention and are not intended to constitute a limitation on their scope, which is defined in the appended claims.

Comparative Example 1

The reference carrier material was extruded alumina (CS-1), prepared with pore volume (PV) of 0.71 cm³/g and surface area (SA) of 200 m²/g.

Comparative Example 2

About 25 cm³ of carrier (CS-1) was soaked in 60 cm³ of $Cu(NO_3)_2$ solution (15.5% Cu) for 30 minutes. The soaked extrusion was dried at 110 GC overnight, then calcined at 350° C. for 3 hours. This active material had 24.6% CuO on the extrusion (CS-2).

Comparative Example 3

An active material was prepared as described generally in Comparative Example 2, using 50% $Mn(NO_3)_2$ solution instead of the $Cu(NO_3)_2$ solution. This active material had 20.7% $MnO_2$ on the extrusion (CS-3).

Comparative Example 4

An active material was prepared as described generally in Comparative Example 2, using 15.5% $AgNO_3$ solution instead of the $Cu(NO_3)_2$ solution. This active material had 11.8% AgO on the extrusion (CS-4), Comparative Example 5

An active material was prepared as described generally in Comparative Example 2, using 15.5 wt % of Mo as ammonium molybdate solution instead of the $Cu(NO_3)_2$ solution. This active material had 16.7% $MoO_3$ on the extrusion (CS-5).

Example 1

An active material was prepared as described generally in Example 2, using 100 cm³ $Cu(NO_3)_2$ and $Mn(NO_3)_2$ solution with 3 wt % of Cu+12 wt % of Mn as metals. This active material had 8.0% CuO and 24.8% $MnO_2$ on the extrusion (S-1).

Example 2

An active material was prepared as described generally in Example 1, using 60 cm³ $Cu(NO_3)_2$ and $Mn(NO_3)_2$ solution with 5 wt % of Cu+10 wt % of Mn as metals. This active material had 10.6% CuO and 16.3% $MnO_2$ on the extrusion (S-2).

Example 3

An active material was prepared as described generally in Example 1, using 50 cm³ $Cu(NO_3)_2$ and $Mn(NO_3)_2$ solution with 8 wt % of Cu+8 wt % of Mn as metals. This active material had 13.1% CuO and 12.2% $MnO_2$ on the extrusion (S-3), with PV of 0.45 cm³/g, and SA of 168 m²/g.

Example 4

An active material was prepared as described generally in Example 1, using 60 cm³ $Cu(NO_3)_2$ and $Mn(NO_3)_2$ solution with 10% Cu+ 5% Mn as metals. This material had 17.2% CuO and 8.1% $MnO_2$ on the extrusion (S-4).

Example 5

The material was prepared as described generally in Example 1, with the exception of using 30 cm³ 50% $Mn(NO_3)_2$ solution and 15.5% $AgNO_3$ solution. This material had 14.6% $MnO_2$ and 5.1% AgO on the extrusion (S-5).

Example 6

The material was prepared as described generally in Example 1, with the exception of using 30 cm³ 15.5%

Cu(NO$_3$)$_2$ solution and 15.5% Mo ammonia molybdate solution. This material had 17.4% CuO and 5.2% MoO$_3$ on the extrusion (S-6).

Example 7

An active material (S-7) having 56% CuO, 10% MnO$_2$ and 34% Al$_2$O$_3$ was prepared by co-precipitating Cu(NO$_3$)$_2$, Mn(NO$_3$)$_2$ and Al(NO$_3$)$_3$ with Na$_2$CO$_3$. The precipitate was washed followed by drying and calcining. The calcined powder was formed to tablets by pressing, which had PV of 0.2 cm$^3$/g and SA of 44 m$^2$/g.

Example 8

A material (S-8) was prepared as described generally in Example 7, with the exception of using different concentration of Mn(NO$_3$)$_2$. The material had 62% CuO, 0.5% MnO$_2$ and 38% Al$_2$O$_3$.

Example 9

A material (S-9) having 44% CuO, 44% ZnO and 13% Al$_2$O$_3$ was prepared by precipitating copper amine, zinc amine and Al(OH)$_3$ with Na$_2$CO$_3$. The precipitate was washed followed by drying and calcining. The calcined powder was formed to tablets by pressing.

Example 10

A material (S-10) having 57% CuO, 30% ZnO, 1% Cs$_2$O and 12% Al$_2$O$_3$ was prepared by impregnation of Cs$_2$CO$_3$ compound on to copper/zinc/aluminum oxide, which was made by precipitation as described generally above. The powders were pressed into tablets.

Example 11

A material (S-11) having 22% CuO, 50% ZnO, 12% Cr$_2$O$_3$ and 15% Al$_2$O$_3$ was prepared by precipitation. The precipitate was washed, followed by drying and calcining. The calcined powder was formed into tablets by pressing, which tablets had PV of 0.28 cm$^3$/g and SA of 74 m$^2$/g.

Example 12

A material (S-12) was prepared as described generally in Example 7, with the exception of using a different solution concentration. The final product had 23% CuO, 36% ZnO and 41% Cr$_2$O$_3$.

Example 13

A material (S-13) having 38% CuO, 43% ZnO, 9% BaO and 10% Al$_2$O$_3$ was prepared by precipitation. The precipitate was washed followed by drying and calcining. The calcined powder was formed into tablets by pressing, which tablets had PV of 0.2 cm$^3$/g and SA of 53 m$^2$/g.

Example 14

A material (S-14) having 19% CuO, 69% MnO$_2$, 2.5% K$_2$O, 1.5% Al$_2$O$_3$ and 8% SiO$_2$ was prepared by precipitation. The precipitate was washed followed by drying and calcining. The calcined powder was formed into tablets by pressing, which tablets had PV of 0.53 cm$^3$/g and SA of 210 m$^2$/g.

Example 15

Removal of Chloride

The halogen removal test was performed at a fixed bed system with a Ø18 mm glass reactor. 10 cm$^3$ of formed particles were loaded in the reactor. The active material was treated with 3% H$_2$/N$_2$ stream for 12 hours at 220° C. before performing the halogen removal test. Halogen removal test 1 was performed with 330 ppb HCl (V) in 33.5% H$_2$/33.5% N$_2$/33% H$_2$O at 120 kPa and 220° C. The outlet stream was condensed with a chiller. Hydrogen chloride in the condensation was analyzed periodically with ion chromatography (IC). After 127 hours on stream, the spent samples were unloaded and analyzed for picked up Chloride content. The results are summarized in the Table 1.

TABLE 1

Chloride absorption of the active material from Example 15

| Sample ID | Time-on-stream (hrs) | Cl (ppm) |
|---|---|---|
| Spent CS-1 | 127 | 265 |
| Spent CS-2 | 127 | 415 |
| Spent CS-3 | 127 | 774 |
| Spent CS-4 | 127 | 544 |
| Spent CS-5 | 127 | 10 |
| Spent S-1 | 127 | 1070 |
| Spent S-2 | 127 | 1161 |
| Spent S-3 | 127 | 1076 |
| Spent S-4 | 127 | 1097 |
| Spent S-5 | 127 | 1341 |
| Spent S-6 | 124 | 579 |
| Spent S-7 | 147 | 798 |
| Spent S-8 | 147 | 733 |
| Spent S-9 | 127 | 628 |
| Spent S-10 | 147 | 887 |
| Spent S-11 | 147 | 703 |
| Spent S-12 | 147 | 773 |
| Spent S-13 | 127 | 684 |

The active materials that include both a first metal and a second metal as described herein superior chlorine absorption as compared to active materials that included only a first metal or a second metal (or neither in the case of CS-1).

Example 16

Removal of Chloride

A second halogen removal test was performed with 3 ppm HCl (V) in a simulated syngas composition for copper-based low temperature shift catalysts in 58% H$_2$/2% CO/6% CO$_2$/1% N$_2$/33% H$_2$O at 120 kPa and 200° C. The active material was treated with 3% H$_2$/H$_2$ stream for 12 hours at 200° C. before performing the halogen removal test. The results are summarized in Table 2, and demonstrate that the active materials described herein can function at different gas compositions, and thus can be used for syngas purification before the water gas shift catalyst bed to guard against poisoning of the copper-based water gas shift catalyst.

TABLE 2

Chloride absorption of the active material from Example 16

| Sample ID | Time-on-stream (hrs) | Cl (ppm) |
|---|---|---|
| Spent S-16 | 143 | 591 |
| Spent S-17 | 143 | 664 |

Example 17

Removal of Chloride

A third halogen removal test was performed with 3 ppm HCl (v) or 35 ppm (v) in 33.5% $H_2$/33.5% $N_2$/33% $H_2O$ at 120 kPa and 220° C. The active material was treated with 3% $H_2/N_2$ stream for 12 hours at 220° C. before performing the halogen removal test. The results are summarized in Table 3, and demonstrate that the active materials described herein can be used for chloride removal at higher chloride concentrations.

TABLE 3

Chloride absorption of the active material from Example 17

| Sample ID | HCl in the stream (ppm) | Time-on-stream (hrs) | Cl (%) |
|---|---|---|---|
| Spent S-17 | 3 | 308 | 0.69 |
| Spent S-18 | 3 | 308 | 0.84 |
| Spent S-19 | 3 | 308 | 1.65 |
| Spent S-17 | 35 | 30 | 0.93 |
| Spent S-18 | 35 | 30 | 0.99 |

It is understood that the examples and embodiments described herein are for illustrative purposes only. Unless clearly excluded by the context, all embodiments disclosed for one aspect of the invention can be combined with embodiments disclosed for other aspects of the invention, in any suitable combination. It will be apparent to those skilled in the art that various modifications and variations can be made to the present invention without departing from the scope of the invention. Thus, it is intended that the present invention cover the modifications and variations of this invention provided they come within the scope of the appended claims and their equivalents. All publications, patents, and patent applications cited herein are hereby incorporated herein by reference for all purposes.

We claim:

1. An active material comprising:
   (a) one or more first metals, the first metals being selected from the group consisting of iron, cobalt, nickel, copper and silver; and
   (b) one or more second metals, the one or more second metals being selected from the group consisting of alkali metals, alkaline earth metals, scandium, yttrium, titanium, zirconium, hafnium, vanadium, niobium, tantalum, chromium, molybdenum, tungsten, manganese, technetium, and rhenium,
   wherein the total weight of the one or more first metals and the one or more second metals (calculated as oxides) is about 20 to about 95 weight % of the active material;
   wherein the ratio of the one or more first metals to the one or more second metals is in the range of about 1:4 to about 4:1, and
   wherein the active material is in contact with a $H_2$-containing gas, in which
   (a) at least about 80% of each of the one or more first metals are is present in a metallic state; and
   (b) at least about 80% of each of the one or more second metals is present in a metal oxide and/or metal hydroxide state.

2. An active material according to claim 1, wherein the one or more first metals are copper or silver.

3. An active material according to claim 1, wherein the one or more second metals are cesium or barium.

4. An active material according to claim 1, wherein the one or more second metals are cesium, barium, vanadium, chromium or manganese.

5. An active material according to claim 1, wherein the one or more second metals are vanadium, chromium, or manganese.

6. An active material according to claim 1, the total weight of the copper and the one or more second metals (calculated as oxides) is about 30 to about 95 weight % of the active material.

7. An active material according to claim 1, wherein the active material further comprises one or more carriers or binders selected from zinc oxide, aluminum oxide, silicon dioxide, magnesium oxide, manganese oxide, zirconium oxide, titanium oxide, a clay, a zeolite, carbon, a cement, and a combination thereof.

8. An active material according to claim 1, wherein the active material is formed as an extrusion, spheres, pellets, cylinders, or tri-quadrulobes.

9. An active material according to claim 1, wherein the active material has a pore volume of about 0.1 to about 1.5 $cm^{3/g}$ and a surface area of about 10 to about 400$m^{2/g}$.

10. An active material according to claim 1, wherein the $H_2$-containing gas is a gas stream that contains from about 0.001 to about 100 ppm chloride.

11. An active material according to claim 10, wherein the chloride is hydrogen chloride.

12. An active material according to claim 1, wherein the $H_2$-containing gas is a synthesis gas stream.

13. An active material according to claim 1, wherein the one or more second metals are selected from the group consisting of manganese, molybdenum, zinc, cesium, chromium, barium and potassium.

14. An active material according to claim 1, wherein the second metal is manganese.

15. An active material according to claim 1, wherein the one or more first metals is copper.

16. An active material comprising:
   (a) one or more first metals, the first metals being selected from the group consisting of iron, cobalt, nickel, copper and silver; and
   (b) one or more second metals, the one or more second metals being selected from the group consisting of alkali metals, alkaline earth metals, scandium, yttrium, titanium, zirconium, hafnium, vanadium, niobium, tantalum, chromium, molybdenum, tungsten, manganese, technetium, and rhenium,
   wherein the total weight of the one or more first metals and the one or more second metals (calculated as oxides) is about 20 to about 95 weight % of the active material; and
   wherein the ratio of the one or more first metals to the one or more second metals is in the range of about 1:4 to about 4:1;
   wherein the active material is in contact with a $H_2$-containing gas, in which
     the one or more first metals are present as one or more discrete substantially metallic phases in the active material; and
     the one or more second metals are present as one or more discrete substantially oxide and/or hydroxide phases in the active material.

17. An active material according to claim 16, wherein the one or more first metals are selected from copper and silver.

18. An active material according to claim 16, wherein the one or more second metals are selected from the group consisting of manganese, molybdenum, zinc, cesium, chromium, barium and potassium.

19. An active material comprising:
(a) one or more first metals selected from iron, cobalt, nickel and copper; and
(b) one or more second metals, the one or more second metals being selected from the group consisting of alkali metals, alkaline earth metals, scandium, yttrium, titanium, zirconium, hafnium, vanadium, niobium, tantalum, chromium, molybdenum, tungsten, manganese, technetium, and rhenium,
wherein the total weight of the one or more first metals and the one or more second metals (calculated as oxides) is about 20 to about 95 weight % of the active material;
wherein the ratio of the one or more first metals to the one or more second metals is in the range of about 1:4 to about 4:1;
wherein the one or more first metals are present as one or more discrete substantially metallic phases in the active material; and
wherein the one or more second metals are present as one or more discrete substantially oxide and/or hydroxide phases in the active material.

20. An active material according to claim 19, wherein the one or more second metals are selected from the group consisting of manganese, molybdenum, zinc, cesium, chromium, barium and potassium.

21. An active material according to claim 19, wherein the one or more first metals is copper.

22. An active material according to claim 19, wherein the active material is disposed at a pressure of about 100 kPa to about 10 MPa and at a temperature of about 100 °C. to about 500°C.

23. A method for reducing halide concentration in a gas stream, the method comprising contacting the gas stream with the active material according to claim 1 at a process pressure in the range of about 100 kPa to about 10 MPa and a process temperature in the range of about 100 °C. to about 500 °C. wherein
(a) at least about 80% of each of the is present in a metallic state at the process conditions; and
(b) at least about 80% of each of the one or more second metals is present in a metal oxide and/or metal hydroxide state at the process conditions.

24. A method according to claim 23, wherein the gas stream contains about 0.1 to about 10 parts per million of halide.

25. A method according to claim 23, wherein the halide is hydrogen chloride.

26. A method according to claim 23, further comprising, after contacting the gas stream with the active material, subjecting the gas to a process selected from reforming, high temperature shift, Fischer-Tropsch catalysis, and copper-based low temperature shift.

* * * * *